United States Patent
Schroeder et al.

(10) Patent No.: US 11,841,098 B2
(45) Date of Patent: Dec. 12, 2023

(54) WIRELESS CONNECTION SAFETY BREAK DEVICE

(71) Applicants: Tim Schroeder, St. Louis, MO (US); Arthur C. Fink, Londell, MO (US)

(72) Inventors: Tim Schroeder, St. Louis, MO (US); Arthur C. Fink, Londell, MO (US)

( * ) Notice: Subject to any disclaimer, the term of this patent is extended or adjusted under 35 U.S.C. 154(b) by 0 days.

(21) Appl. No.: 16/873,407

(22) Filed: Apr. 8, 2020

(65) Prior Publication Data
US 2020/0332935 A1 Oct. 22, 2020

Related U.S. Application Data

(60) Provisional application No. 62/920,268, filed on Apr. 22, 2019.

(51) Int. Cl.
*F16L 29/00* (2006.01)
*G08C 17/02* (2006.01)
*F16K 15/00* (2006.01)

(52) U.S. Cl.
CPC .............. *F16L 29/00* (2013.01); *G08C 17/02* (2013.01); *F16K 15/00* (2013.01)

(58) Field of Classification Search
CPC ........ B60K 15/04; B67D 7/04; B67D 7/0401; B67D 7/0476; B67D 7/08; B67D 7/12; B67D 7/145; B67D 7/222; B67D 7/3218; B67D 7/34; B67D 7/54; F16K 15/00; F16L 29/00; F17C 13/025; G07F 13/025; G07F 13/06; G07F 17/00; G08C 17/02
USPC ........................................................ 340/532
See application file for complete search history.

(56) References Cited

U.S. PATENT DOCUMENTS

| | | | |
|---|---|---|---|
| 4,498,606 A * | 2/1985 | DiRienzo | B67D 7/3218 137/355.16 |
| 4,827,977 A | 5/1989 | Fink, Jr. | |
| 5,365,973 A | 11/1994 | Fink, Jr. et al. | |
| 5,566,438 A | 10/1996 | Bullock | |
| 5,720,327 A | 2/1998 | Foster, Jr. | |
| 5,758,682 A | 6/1998 | Cain | |
| 5,896,260 A | 4/1999 | Esposito | |
| 6,182,695 B1 | 2/2001 | Coates, III et al. | |
| 6,192,934 B1 | 2/2001 | Coates, III et al. | |
| 6,334,474 B1 * | 1/2002 | Rababy | B67D 7/3218 137/68.14 |
| 6,924,733 B1 * | 8/2005 | McTier | B67D 7/3218 137/68.18 |
| 8,251,084 B2 | 8/2012 | Brown | |
| 8,578,957 B2 | 11/2013 | Wolff | |
| 9,322,498 B2 | 4/2016 | Wolff et al. | |
| D839,400 S | 1/2019 | Wolff | |
| 10,580,295 B2 | 3/2020 | Albornoz | |
| 2005/0000588 A1* | 1/2005 | Webb | B67D 7/84 141/94 |
| 2013/0025698 A1* | 1/2013 | Safi-Samghabadi | B67D 7/3218 137/68.18 |

(Continued)

*Primary Examiner* — Stephen R Burgdorf
(74) *Attorney, Agent, or Firm* — Sandberg Phoenix & von Gontard PC

(57) ABSTRACT

A wireless communication safety break device is disclosed which has an upper safety break portion having a fuel inlet, an upper portion check valve, an upper portion communications device, an upper portion contact point or switch, and a lower safety break portion having a fuel outlet, a lower portion check valve, a lower portion contact point or switch, and a locator device.

6 Claims, 4 Drawing Sheets

(56) References Cited

U.S. PATENT DOCUMENTS

| | | | | |
|---|---|---|---|---|
| 2013/0146700 A1* | 6/2013 | Wigard | .................... | B64D 1/16 |
| | | | | 242/407 |
| 2016/0229680 A1* | 8/2016 | Cornett | .................... | B67D 7/04 |
| 2017/0073211 A1* | 3/2017 | Wilson | .................... | B67D 7/348 |
| 2018/0080427 A1* | 3/2018 | Ghannam | ................ | F02N 15/10 |
| 2018/0373209 A1* | 12/2018 | Ralphs | .................... | H04L 67/12 |

* cited by examiner

WIRELESS CONNECTION SAFETY BREAK DEVICE

CROSS-REFERENCE TO RELATED APPLICATION

This application is a Continuation-in-Part of the provisional application Ser. No. 62/920,268, filed on Apr. 11, 2019.

FIELD OF THE INVENTION

This disclosure generally relates to a safety break device for a fuel dispenser for a vehicle fuel storage tank, and in particular to a wireless connection safety break device within the fuel line hose, and which completes all aspects of a sales transaction and prevents fuel from being leaking on the ground and into the atmosphere.

BACKGROUND

Gas stations have fuel storage tanks, such as underground tanks that are used to store gasoline or fuel, with the tanks being connected to above ground fuel pumps dispensers. The fuel pump has several visible components such as a screen, a keypad, a credit card reader, a hose, a breakaway device, and a nozzle. There are several other components associated with the pump dispenser that are not visible to a customer. In a typical transaction the customer drives up to the fuel pump, enters data for receiving fuel, selects a grade of gasoline, removes the nozzle from a holster, inserts the nozzle into a gas tank opening or filling inlet of a car, presses a lever associated with the nozzle, and pumping of fuel from the storage tank into the gas tank thus begins. Once pumping is complete, the nozzle is removed from the gas tank inlet pipe and inserted back into the holster. The transaction is completed with the customer receiving a receipt and driving away from the gas station.

Although this is the typical and routine process, there are times when the customer's memory lapses or forgets about the nozzle and drives away with the nozzle still in the gas tank inlet pipe and fuel still being pumped or just shut off. In order to prevent a serious accident from occurring there is a breakaway device, or a safety break device inserted in the fuel delivery hose between the nozzle and the pump. The breakaway device is operated when the nozzle is pulled away and the delivery hose stretches beyond a predetermined pull force. The breakaway device has a pair of internal check valves. Once the breakaway device has separated, the pair of check valves close to prevent fuel from escaping from the fuel pump dispenser and from the portion of the hose having the nozzle. In this manner, fuel is prevented from leaking on the ground and into the atmosphere to avoid potential safety and environmental hazards.

The breakaway device is a useful device that assists in preventing further accident or damage. However, one problem associated with its use is that the gas station owner has a loss of a sale of fuel due to the electronic transaction never being completed. Since the nozzle is not returned to the holster the transaction or sale is not completed. The customer is not charged for the fuel that is pumped into the customer's gas tank. The station owner realizes a loss of revenue unless an attendant is mindful enough to manually engage the flapper switch inside the dispenser holster to complete the transaction in a timely manner or to pursue payment if the customer returns to the same gas station.

The present disclosure is designed to obviate and overcome many of the disadvantages and shortcomings experienced with a gas station owner losing money on an interrupted sale. The present disclosure provides a wireless connection safety break device that ensures that a sale is completed and that there is no loss of revenue. Moreover, the present disclosure is related to a wireless connection safety break device that is designed and constructed to be able to locate a nozzle that has been accidentally broken away from a fuel dispenser. Further, the present disclosure is directed to a wireless connection safety break device that quickly shuts off a fuel pump and instantly completes a sales transaction to minimize loss and damage. Also, the present disclosure provides for a wireless connection safety break device that is capable of being located and retrieved in order for the device to be utilized again and to prevent loss of equipment.

SUMMARY OF THE INVENTION

The present disclosure is a wireless communication safety break device which comprises an upper safety break portion having a fuel inlet, an upper portion check valve, an upper portion communications device, an upper portion contact point, or switch, and a lower safety break portion having a fuel outlet, a lower portion check valve, a lower portion contact point, or switch, and a locator device.

In another form of the present disclosure, a wireless communication safety break device comprises an upper safety break portion having a fuel inlet, an upper portion check valve, an upper portion communications device, an upper portion contact point, and a lower safety break portion having a fuel outlet, a lower portion check valve, a lower portion contact point wired to the upper portion contact point that is adapted to be separated from the upper portion contact point when the upper safety break portion is separated from the lower safety break portion, and an optional locator device.

In yet another form of the present disclosure, a wireless communication safety break device comprises an upper safety break portion having a fuel inlet, an upper portion check valve, an upper portion communications device, an upper portion contact point, and a lower safety break portion having a fuel outlet, a lower portion check valve, a lower portion contact point connected to the upper portion contact point in a wireless configuration and adapted to be separated from the upper portion contact point when the upper safety break portion is separated from the lower safety break portion, and a locator device.

An alternative configuration would have the wireless connection safety break device within the fuel line hose in communication with a fuel supply valve to the dispenser to limit and/or stop the flow of fuel in the event of said safety break device becoming disconnected or separated.

Also, the present disclosure provides for a wireless connection safety break device that is in communication with a fuel supply valve in the dispenser that can limit or completely stop the flow of fuel in the event of the safety break device becoming disconnected or separated.

Yet another configuration would have the wireless connection safety break device within the fuel line hose in communication with the dispenser via the same method when the nozzle is hung back up in the dispenser holster or when the nozzle is in proximity with the dispenser to limit and/or stop the flow of fuel in the event of said safety break device becoming disconnected or separated.

The present disclosure can also provide for a wireless communication safety break device that is used to communicate with the dispenser holster or in proximity with the dispenser to limit and/or stop the flow of fuel into or from the dispenser.

The present disclosure provides a wireless communication safety break device that reduces loss of sales of fuel.

The present disclosure is directed to a wireless communication safety break device that allows completion of a transaction in the event a fuel nozzle is not returned to a fuel dispenser holster of a fuel pump.

The present disclose provides a wireless communication safety break device that is simple to operate and provides highly reliable results to safely dispense fuel from a fuel pump of a storage tank at a gasoline station.

The present disclosure provides a wireless communication safety break device that may be used to stop the flow of fuel in an emergency situation where a fuel line is broken or severed.

The present disclosure is also directed to a wireless communication safety break device that may be used to locate a nozzle that has been accidentally broken away from a fuel dispensing pump.

In the preferred embodiment, the connection between the upper and lower half of the safety break is a magnetic proximity sensor.

The present disclosure further provides a wireless communication safety break device that may be employed to prevent fire, property damage, and injury, or even death.

The present disclosure provides a wireless communication safety break device that may be used to communicate with a point of sale system to complete a transaction, particularly when a credit card is used as the means for payment.

The present disclosure is further directed to a wireless communication safety break device that can be recoverable to be reused.

The present disclosure is directed to a wireless communication safety break device that may be located and retrieved in order to reduce loss of equipment.

The present disclosure is also directed to a wireless communication safety break device that could be encased therein a communication device that can send a signal to a Point of Sale (POS) system in order to complete a sales transaction to reduce loss of revenue for a gasoline filing station.

The present disclosure also provides for a wireless communication safety break device that is used to communicate with a valve that allows fuel into the dispenser.

These and other advantages of the present disclosure will become apparent to those skilled in the art after considering the following detailed specification in conjunction with the accompanying drawings.

DETAILED DESCRIPTION OF PREFERRED EMBODIMENTS

Figure 1:
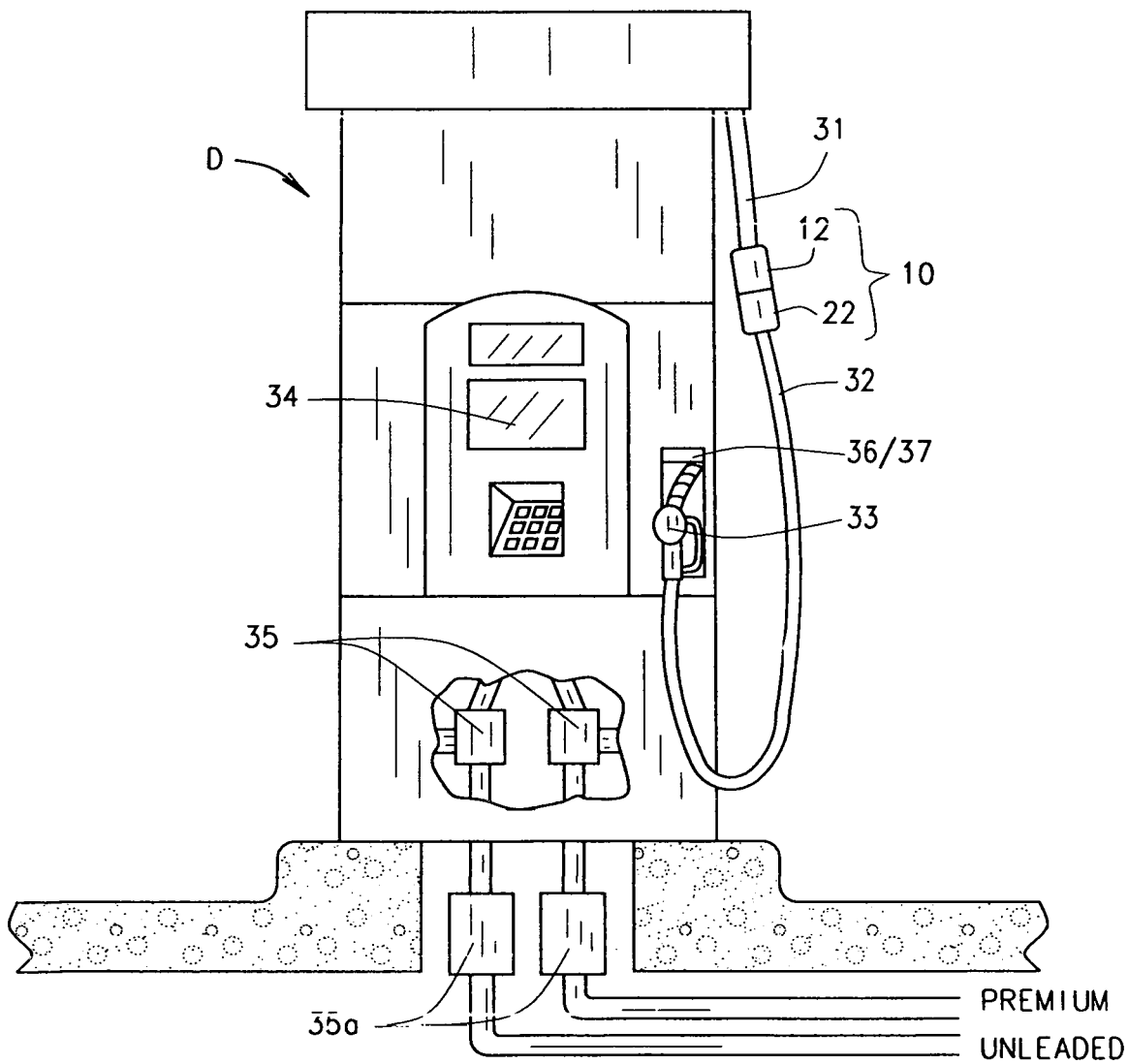
FIG. 1 is a dispenser configuration with a wireless safety break device shown with several communication options to shut-off fuel flow.

In referring to the schematic as shown in FIG. 1, therein is shown a dispenser D, which includes the upper part of the dispensing hose 31, which connects with the safety break 10, as noted in the art, and then further attaches with the portion of the dispensing hose 32 that connects with the nozzle 33. A flapper switch 36 is included within the seat for the nozzle, and a proximity sensor 37 can also be provided therein. 33 is the nozzle for the fuel pump. Then, the dispenser has a point of sale system 34, that provides information for the customer delivering gas to his/her vehicle. Then, within the dispenser, as at 35, are the fuel/shear valves, that are located within the dispenser, or they may be located below the dispenser, as noted at 35a, as can be seen. FIG. 1, as noted, is a typical dispenser configuration, with the smart safety break communications device of this invention, that may be optionally connected with the dispenser, in order to shut-off the flow of fuel when, as previously summarized, a customer may inadvertently drive off with the fuel dispensing nozzle and as connected with its hose, still inserted within the fuel fill pipe of the vehicle.

Figure 2:
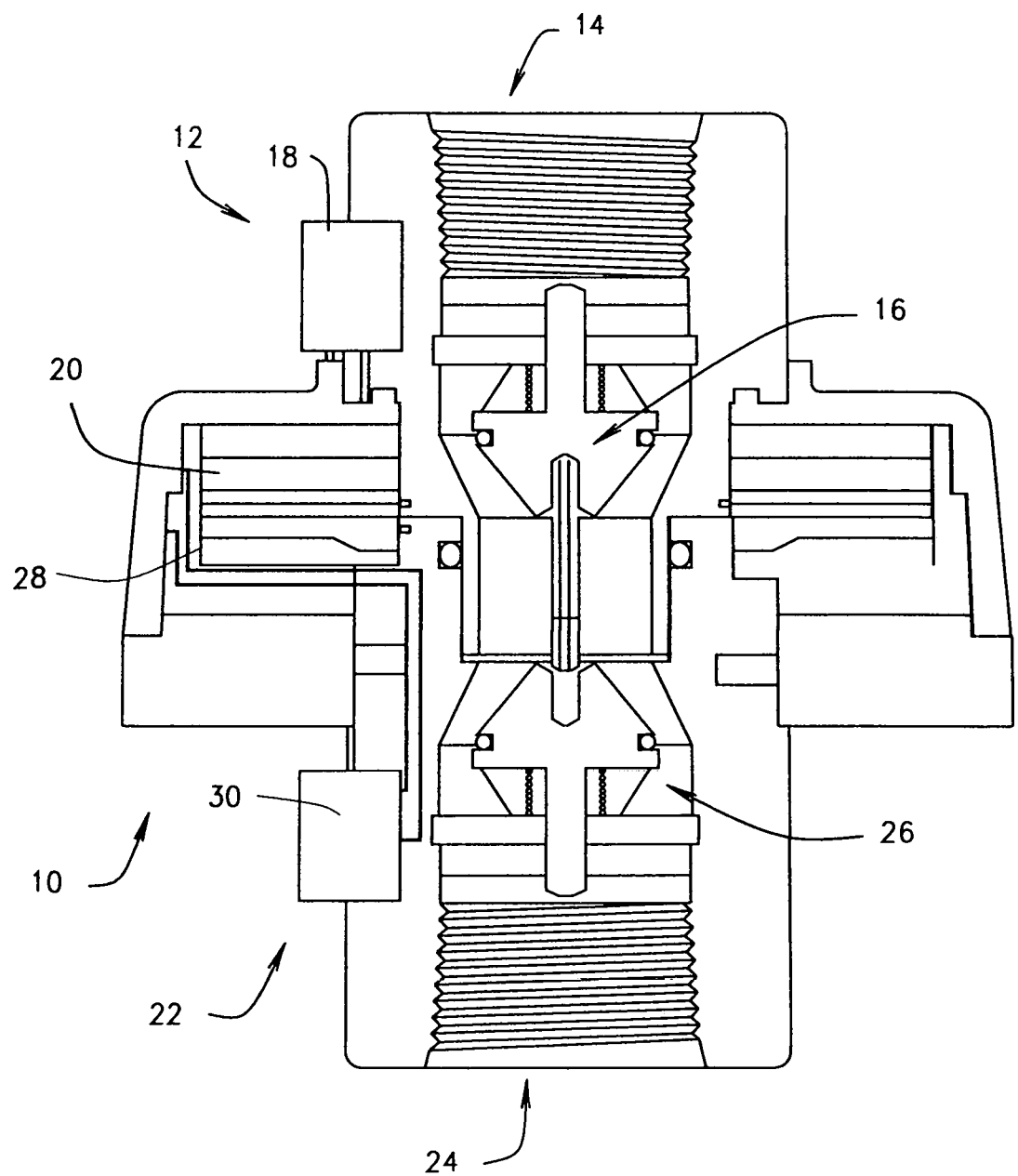
FIG. 2 is a cross-sectional view of a wireless connection safety break device constructed according to the present disclosure shown in a connected configuration.

Referring further to the drawings, wherein like numbers refer to like items, the number 10 identifies a preferred embodiment of a wireless communication safety break device constructed according to the present disclosure. With reference now to FIG. 2, the wireless communication safety break device 10 is shown to comprise an upper safety break portion 12 having a fuel inlet 14, an upper portion check valve 16, an upper portion communications device 18, an upper portion contact point or switch 20, a lower safety break portion 22 having a fuel outlet 24, a lower portion check valve 26, a lower portion contact point or switch 28, and a locator device 30. Although not shown, the fuel inlet 14 is connected to a portion of a hose 31 of a fuel pump, and fuel flows from the portion of the hose into the fuel inlet 14. The fuel outlet 24 is also connected to another portion of the hose 32 which terminates at a fuel dispensing nozzle 33. As can be appreciated, in normal operation, fuel is allowed to flow through the device 10 and the check valves 16 and 26 are normally opened. The lower safety break portion 22 is adapted to separate from the upper safety break portion 12 when the nozzle is left in a fuel inlet of an automobile. Once a predetermined pull force is reached, as when a vehicle wrongfully drives off, the lower safety break portion 22 will separate from the upper safety break portion 12. The check valves 16 and 26 will close to shut off the fuel pump and to prevent any fuel from escaping from the remaining portion of the hose connected to the fuel pump and the extracted portion of the hose connected to the nozzle. In this manner, a fuel leak is prevented, and any possibility of a fire is diminished or eliminated.

Once the lower safety break portion 22 separates from the upper safety break portion 12 the upper portion contact point or switch 20 is no longer connected to the lower portion contact point or switch 28. This open circuit is detected by the upper portion communications device 18 which sends a signal to a POS system 34 to complete the fueling transaction instantly and to charge the credit or debit card that was used to initiate the fueling transaction. If the flow of fuel from the pump has not been shut off, the upper portion communications device 18 may also control this function to shut off the pump or close a valve 35. Alternatively, the upper portion communications device 18 may also send a signal to the flapper switch 36 in the dispenser holster or a proximity sensor 37 to stop the transaction and/or the flow of fuel. With the sale abruptly completed, the station owner will not experience a financial loss on the sale of the fuel and will not have to pursue the customer. Also, the open circuit is detected by the locator device 30 which is programmed to transmit a location signal. Use of the location signal will allow the station owner to receive a signal and to recover the extracted equipment, such as the portion of the hose, the nozzle, and the lower safety break portion 22. Further, locator device 30 will allow the station owner to identify the customer who drove off and to seek reimbursement from the customer for any damage to the device, station, or other equipment.

By way of example only, the upper portion communications device 18 may be a microcontroller such as a device manufactured by STMicroelectronics known as STM32F756 family of microcontrollers or other similar microcontroller that may be used and which accommodate low power radio frequency (RF) transmitting and receiving. The device 18 is encased within the upper safety break portion 12. Also, by way of example only, the locator device 30 may be a nano or micro GPS (global positioning system) positioning and locating type device or chip such as the Multi Nano Spider ORG4500-R01 module manufactured by OriginGPS.

The locating device 30 may also incorporate a communications device using a microcontroller similar to the upper portion communications device 18.

Figure 3:
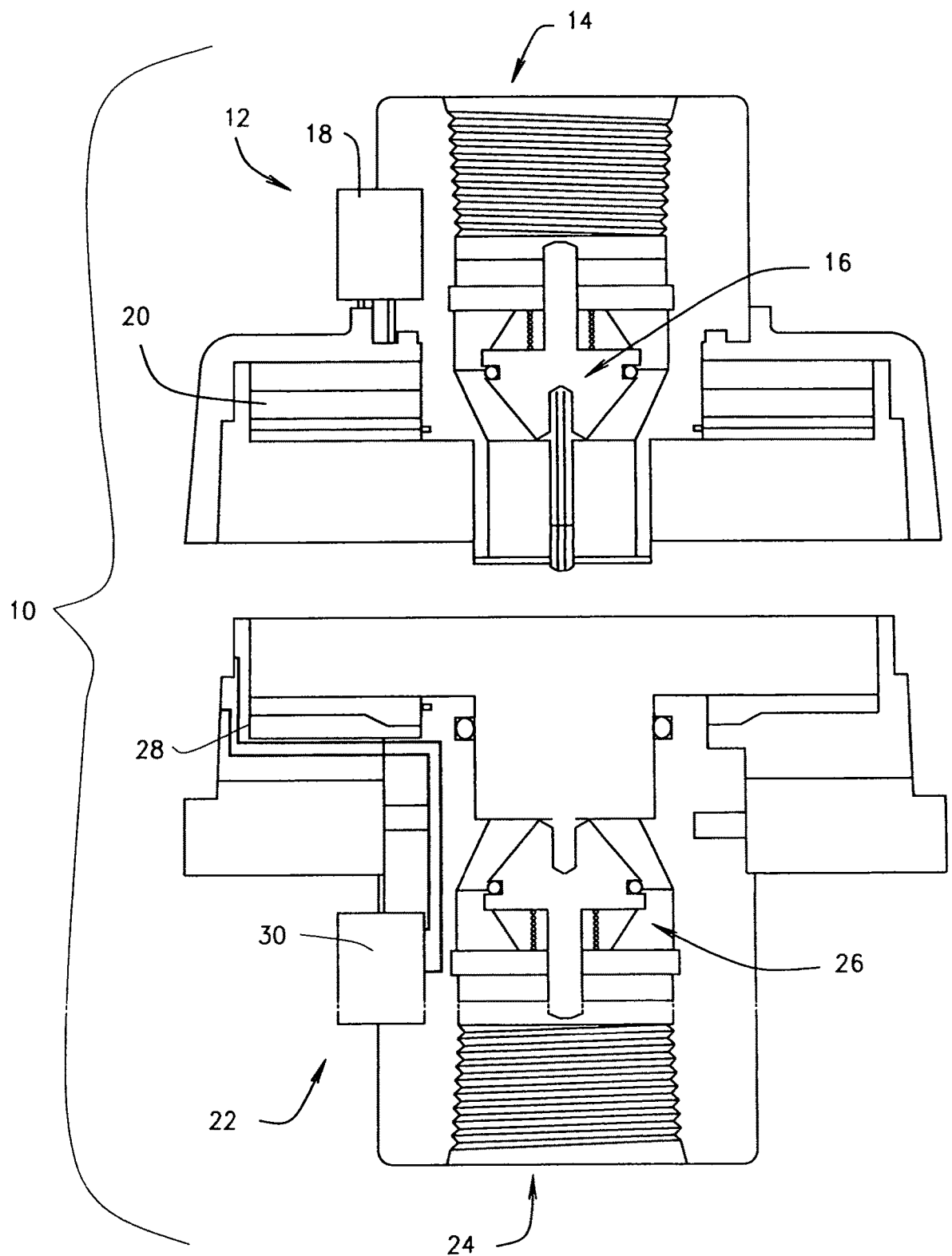
FIG. 3 is a cross-sectional view of a wireless connection safety break device constructed according to the present disclosure shown in a disconnected configuration.

FIG. 3 illustrates a cross-sectional view of the wireless connection safety break device 10 constructed according to the present disclosure shown in a disconnected or separated configuration. The wireless communication safety break device 10 is shown to comprise the upper safety break portion 12 having encased therein the fuel inlet 14, the upper portion check valve 16, the upper portion communications device 18, and the upper portion contact point or switch 20. The lower safety break portion 22 has encased therein the fuel outlet 24, the lower portion check valve 26, the lower portion contact point or switch 28, and the locator device 30. The lower safety break portion 22 is shown separated or disconnected from the upper safety break portion 12. In this manner, any connection between the contacts or switches 20 and 28, whether wired or wireless, has been broken. Once the connection is broken the upper portion communications device 18 sends a signal to either the POS system 34, a valve 35 supplying or allowing fuel to the dispenser, the flapper switch 36, proximity switch 37, or any combination of these options so that the fueling transaction is successfully completed and/or the fuel flow has stopped. This will enable the credit or debit card that was used to initiate the fueling transaction to be charged so that the station owner does not lose receiving funds for the dispensed fuel. Also, the broken connection initiates the operation of the locator device 30. The locator device 30 is programmed or engineered to generate and transmit a location signal so that the station owner will be able to retrieve the lower safety break portion 22, the portion of the hose 32, and the nozzle 33 so that these components can be reused. Further, it is contemplated that the lower safety break portion 22 may be reconnected to the upper safety break portion 12 in order for the device 10 to be utilized again.

Figure 4:
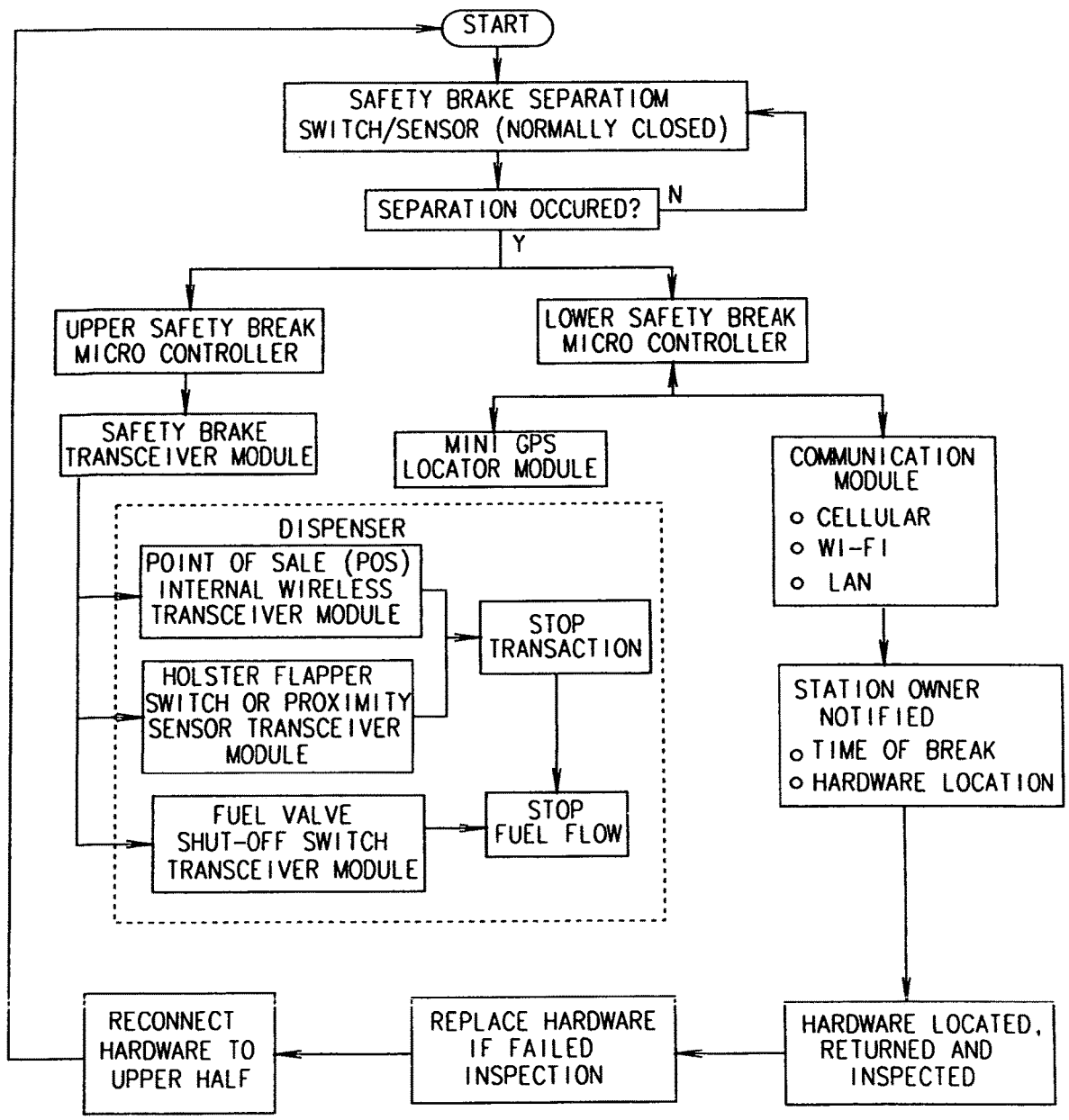
FIG. 4 is a communication flow chart.

FIG. 4 shows a communications flow chart of what would happen from the time a safety break has occurred to the time the hardware has been replaced. As noted, this flow chart indicates that when the safety break 10 has separated, being of the type of safety break as identified in this description, when separation has occurred, the upper safety break microcontroller transmits a signal to the safety break transceiver module. Simultaneously, the lower safety break microcontroller functions in conjunction with a mini GPS locator module, and also communicates with the communication module cellular Wi-Fi Lan. Through this, the transmitted signal from the breakaway is received by the station owner, providing the owner with notification as to the time of the break, and also, through its GPS, indicates the location of the separated hardware. Simultaneously, the safety break transceiver module transmits a signal to the point of sale internal wireless which incorporates the transceiver module, and also submits a signal to the holster flapper switch or proximity sensor transceiver module, and to the fuel valve shut off switch which incorporates the transceiver module. When these modules are operated, after separation has occurred, and since these are located either in the dispenser, or below thereof, in combination with its various valves, it indicates a stop transaction, meaning that fuel flow should cease, and then does stop the fuel flow from the dispenser and through the hose. In addition, the safety break will have shut off the flow of fuel also. Then, once the hardware has been located, returned, inspected, it is then replaced to its fuel dispensing position, meaning that the safety break will be reconnected, and allow the subsequent flow of fuel to customers, for routine dispensing. Obviously, when the hardware has been separated, this means that its nozzle 33, and the lower part of its dispensing hose 32, will have separated, and have been driven off inadvertently by the driver of the vehicle, unknowingly forgetting that the fuel dispensing nozzle was still located within the fill pipe of its vehicle fuel tank.

One configuration might be the valve in the base of the dispenser having the additional function of wireless communication with the safety break. Currently, safety valves in the base of the dispenser are designed for impact to shut off without leaking. Some valves may be temperature sensitive to mechanically shut off in case of a fire. The same on a different valve would now be in communication with the safety break to shut off in the event of a drive-a-way.

Another configuration would be the flapper would be the flapper switch or proximity sensor in the dispenser holster having addition function of wireless communication with the safety break. Currently, flapper switches in the dispenser holsters are designed to close when the fuel nozzle is returned to the holster to complete the transaction and/or stop the flow of fuel. In the absence of the nozzle being returned to the dispenser holster, the flapper switch or proximity sensor would be engaged by the wireless communication safety break to complete the transaction and/or stop the flow of fuel in the event the safety break is disconnected or separated.

From all that has been said, it will be clear that there has thus been shown and described herein a wireless communication safety break device. It will become apparent to those skilled in the art, however, that many changes, modifications, variations, and other uses and applications of the subject wireless communication safety break device are possible and contemplated. All changes, modifications, variations, and other uses and applications which do not depart from the spirit and scope of the disclosure are deemed to be covered by the disclosure, which is limited only by the claims which follow.

What is claimed is:

1. A wireless communication safety break device for a dispenser for dispensing of fuel to a vehicle at a station, comprising:
   an upper safety break portion having a fuel inlet, and an upper portion check valve, an upper portion communications device, and an upper contact point or switch, wherein said upper portion communication device is encased within the upper safety break portion;
   a lower safety break portion having a fuel outlet, a lower portion check valve, a lower portion contact point or switch, and a locator device, wherein said locator device is a nano GPS module, and is encased within the lower safety break portion;

a shut-off switch provided in the dispenser; and a fuel dispensing nozzle that is operatively associated with the dispenser;

a microcontroller operatively associated with the upper portion communications device, said microcontroller including software programmed to stop a gasoline dispensing transaction instantly, and to signal the shut-off switch to stop flow of fuel from the dispenser, when a driver has inadvertently driven off with the fuel dispensing nozzle still located within a fill pipe of the vehicle causing the upper safety break portion and lower safety break portion to separate; and wherein said lower safety break portion incorporating said locator device initiates a global positioning system module to transmit a signal to the station as to the location of the separated lower safety break portion due to the driver inadvertently having driven off with the nozzle still located within the fill pipe of the vehicle.

2. The wireless communication safety break device of claim 1 wherein the locator device comprises a wireless communication device capable of sending a signal indicative of a position of said locator device.

3. The wireless communication safety break device of claim 1 wherein the upper portion communications device is a wireless communication device capable of sending a signal.

4. The wireless communication safety break device of claim 3 wherein the locator device comprises a wireless communications device capable of sending a signal indicative of a position of said locator device.

5. The wireless communication safety break device of claim 4 wherein when the upper safety break portion separates from the lower safety break portion said upper portion communications device sends a signal.

6. A wireless communication safety break device of claim 5 wherein the shut-off switch is one of a flapper switch or proximity sensor provided in the dispenser, and a fuel supply valve is provided in combination with the fuel dispenser, wherein, when the safety break device inadvertently separates, the safety break device transmits a signal to the fuel supply valve to shut off the delivery of fuel from the fuel dispenser.

* * * * *